US005957993A

United States Patent [19]

Frigoli et al.

[11] Patent Number: 5,957,993

[45] Date of Patent: Sep. 28, 1999

[54] PROCESS FOR DETERMINING THE FILM OF FUEL DEPOSITED ON THE INTAKE MANIFOLD OF ELECTROINJECTOR ENGINES WITH CONTROLLED IGNITION

[75] Inventors: Agostino Frigoli, Pizzighettone; Giovanni Livraghi, Maleo; Mauro Miorali, San Donato Milanese, all of Italy

[73] Assignee: EURON S.p.A., Milan, Italy

[21] Appl. No.: 09/015,307

[22] Filed: Jan. 29, 1998

[30] Foreign Application Priority Data

Jan. 30, 1997 [IT] Italy ................................ MI97A0172

[51] Int. Cl.$^6$ .......................... G01M 15/00; F02D 41/14

[52] U.S. Cl. ....................... 701/104; 73/117.3; 73/119 A; 701/103; 701/109; 123/480

[58] Field of Search .................................... 701/101, 103, 701/104, 109, 112; 123/480, 486, 488, 490, 491, 492; 73/119 A, 116, 117.2, 117.3

[56] References Cited

U.S. PATENT DOCUMENTS

| | | | |
|---|---|---|---|
| 4,357,923 | 11/1982 | Hideg | 123/492 |
| 4,481,928 | 11/1984 | Takimoto et al. | 123/492 |
| 4,667,640 | 5/1987 | Sekozawa et al. | 123/492 |
| 4,905,653 | 3/1990 | Manaka et al. | 123/489 |
| 5,474,052 | 12/1995 | Aquino et al. | 123/492 |
| 5,586,544 | 12/1996 | Kitamura et al. | 123/480 |
| 5,690,087 | 11/1997 | Schumacher et al. | 123/675 |
| 5,819,714 | 10/1998 | Bush et al. | 701/104 |

FOREIGN PATENT DOCUMENTS 2 713 708 6/1995 France .

*Primary Examiner*—George Dombroske
*Attorney, Agent, or Firm*—Oblon, Spivak, McClelland, Maier & Neustadt, P.C.

[57] ABSTRACT

Process for the quantitative determination of gasoline film deposited on the intake manifold of an engine with controlled ignition, which comprises the following steps:

a) feeding of a first set of injectors (I) with a first fuel selected from those which do not leave deposits in the feeding manifold;

b) opening of the second set of injectors (II) fed with a second fuel to be tested, until an equilibrium stage of the air/fuel ratio equal to that of step (a) is reached;

c) calculation of the mass of fuel film by integrating the difference in the flow-rate values measured in step (b).

7 Claims, 1 Drawing Sheet

Figure 1:
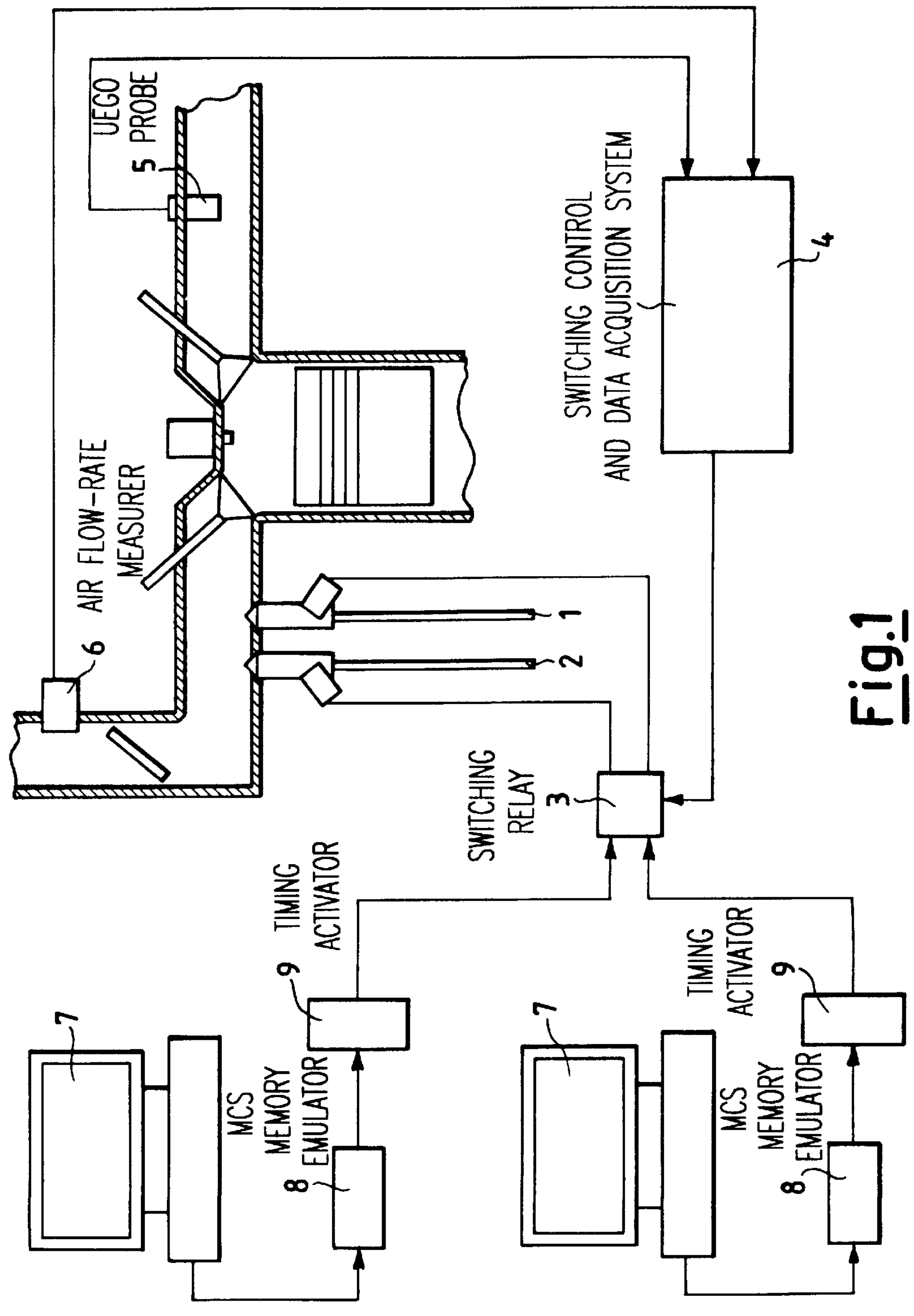

PROCESS FOR DETERMINING THE FILM OF FUEL DEPOSITED ON THE INTAKE MANIFOLD OF ELECTROINJECTOR ENGINES WITH CONTROLLED IGNITION

The present invention relates to a process for quantitatively determining fuel film deposited on the walls of the intake manifold of an electro-injector engine with controlled ignition (Port Fuel Injected engine).

A good control of the air/fuel ratio, with minimum variations with respect to the stoichiometric value, is essential for maximizing the conversion efficiency of the catalytic three-fold exhaust.

The greatest obstacle for controlling the above air/fuel ratio (A/F), is the well-known phenomenum of the deposit of a film of fuel on the walls of the intake manifold. In fact, it is known that sharp increases or reductions in the titer of the mixture, occurring during "transients" (acceleration and deceleration), are connected to disturbances of the above fuel film deposited on the manifold in the section from the injector to the intake valves.

In fact, when the engine is running at constant speed there is no difference between the quantity of gasoline injected and that which actually enters the cylinder: the film of gasoline deposited on the manifold is stable in that whereas a fraction of the spray is deposited, an equivalent quantity of film evaporates in the direction of the combustion chamber.

On the contrary during "transients" the equilibrium between the fraction of gasoline which is deposited and that which evaporates is altered, with consequent variations in the optimum A/F ratio.

The problem therefore arises of quantitatively determining the film of gasoline present on the walls of the manifold. In fact, when the mass is known, it is possible to optimize the compensation factors in the basic algorithm of the electronic control board, which regulates the quantity of gasoline to be injected, in relation to the air intake.

The effects of transients on the deposit level on the walls have been studied in the prior art; in other words the difference was determined between the equilibrium levels of the deposit before and after the disturbances due to increases (positive transient) and decreases (negative transient) of the gasoline injected. Examples of these studies are the articles of Hatsuo Nagaishi, Hiromichi Miwa et al. (An analysis of wall flow and behaviour of fuel in induction system of gasoline engines) in SAE Paper 890837, 1989 and the article of Goran Almkvist, Soren Eriksson (An analysis of air to fuel response in a multi point fuel injected engine under transient conditions) in SAE Paper 932753, 1993.

These techniques however have the disadvantage of being relative and not absolute.

Subsequently Kimitaka Saito, Kiyonori Segiguchi et al. in "A new method to analyze fuel behaviour in a spark Ignition Engine" (SAE Paper 950044, 1995) describe another solution which enables the quantity of deposit to be quantitatively determined, which remains in the manifold with the engine running at fixed regime, by means of the "freezing" technique of the film of fuel. This process allows the absolute measurement of the deposit but has the disadvantage of requiring a specifically equipped engine which means that it cannot be applied to commercially available engines, without very costly interventions.

A process has now been found for the quantitative and absolute measurement of gasoline film which overcomes the disadvantages mentioned above.

In accordance with this, the present invention relates to a process for the quantitative determination of the film of gasoline (or its components) deposited on the intake manifold of an engine with controlled ignition using two sets of injectors (I) and (II), which comprises the following steps:

a) feeding, at a preset air/fuel ratio, a first set of injectors (I) with a first fuel selected from those which do not leave deposits in the feeding manifold; during the feeding of the first set of injectors (I), the second set of injectors (II) being inactive;

b) interruption of the first set of injectors (I) and simultaneous opening of the second set of injectors (II) fed with a second fuel to be tested, until an equilibrium stage of the air/fuel ratio is reached which is equal to that of step (a); during the above step (b) measurements being taken of the in-going air flow-rate ($A_i$) and the $A_i/F_i$ ratio of the exhaust gas, wherein $F_i$ is the flow-rate of fuel which actually enters the combustion chamber, i being the i-th time, the above measurements being carried out with a frequency of from 20 to 200 Hz, preferably from 50 to 150 Hz;

c) calculation of the mass of fuel film by integration of the difference of the flow-rate values measured in step (b);

steps (a) and (b) possibly being carried out inversely, preferably first step (a) and then step (b).

With respect to the methods for carrying out the measurements described in step (b), the measurement of the flow-rate of the in-going air ($A_i$) is preferably effected by using sensors of the hot wire type. The $A_i/F_i$ ratio on the other hand is preferably determined using oxygen sensors of the UEGO type.

The overall duration of the process of the present invention is not determining, even if it is preferable for the experiment to last only a few seconds, which is the normal variation time of deposits during transients. A typical but non-limiting measurement scheme comprises the beginning of data acquisition during the last few seconds of phase (a), normally from 1 to 3 seconds. Phase (b), which begins with the switching of the injectors, preferably lasts from 10 to 30 seconds.

The procedure for obtaining the quantity of gasoline deposited on the intake manifold is described hereunder.

With reference to a test lasting 20 seconds (calculated starting from the moment of the switching of the injectors), for the calculation of the deposit mass in formation ($Md_f$), i.e. in positive transient) the movements between the "stabilized" consumption (Fm), obtained from the average consumption of the last 10 seconds of registration, and all the fuel consumption acquisitions (Fi) of the first 10 seconds, expressed on the basis of the testing time, i.e. a hundredth of a second, are added. The condition Fm>Fi is verified up to the moment of complete stabilization. The fuel which is not present in this balance is that used for forming the deposit, which at the end proves to be $Md_f=\Sigma(Fm-Fi)$, wherein Fi and Fm, calculated on the basis of the measurements of air intake (Qi), are obtained in the following way:

$$Fi = \frac{Qi}{\lambda i \cdot (A/F)\text{ stoich.}};\ Fm = \frac{\sum_{i=1000}^{2000} Fi}{1000}$$

In the above equations λi is the titer of the out-going mixture as measured by the UEGO probe, i is the time expressed in hundredths of a second.

In calculating the mass (Mda) of the deposit in the absorption phase (in negative transient, i.e. in deceleration), it must be considered that until the complete extinction of the pre-existing film on the wall, there will be the condition Fi>Fm, as the mixture is enriched by the evaporation process of the deposit. The following expressions are the result:

$$Md_a=\Sigma(Fi-Fm);\ Md_f=\Sigma(Fm-Fi)$$

Finally the deposit mass present on the wall of the manifold (Md) is obtained from the average of the values of the two phases, and therefore $Md=(Md_f+Md_a)/2$.

It should be pointed out that there is no complete co-incidence between the two determinations as the deposit "in absorption" is always slightly higher than the deposit "in formation".

To be effective, it is sufficient for the sequence of steps (a) to (c) to be carried out once only, even if it is possible to effect an unlimited number of cycles.

The process of the present invention can be used for quantitatively determining the film deposited on the intake manifold by any gasoline.

In addition the process can be used for studying not only commercial gasolines, but also the single components and other types of fuel, for example methanol and oxygenated products.

The process of the present invention has many advantages. Above all it enables fuels to be excellently formulated, avoiding (or greatly reducing) those components which give rise to the formation of deposit.

Secondly, again with reference to the phenomenum mentioned above, it permits the efficiency of additives for fuels to be estimated. It also enables, under the same conditions, (for example with the same fuels), an evaluation of the capacity of various electro-injectors to atomize the fuel. Finally, the results of this process allow a better optimization of the algorithms of electronic control-boards.

A further object of the present invention relates to a system for determining the film of fuel deposited by a fuel, preferably gasoline, on the intake manifold of an engine with controlled ignition (SI engine) which, with reference to FIG. 1, comprises:

a) SI engine equipped with two sets of injectors, (1) and (2), the first (1) fed with a first fuel which does not leave deposits, preferably with 2-methyl-2-butene, the second set (2) fed with the fuel under examination;

b) devices (6) for measuring the air flow-rate;

c) devices (3) for switching the feeding fuel and consequently the injection set;

d) control systems (4) of the two injector sets, each equipped with its own feeding system, independent of each other;

e) memory emulators (8), computers (7) interfaced with each of the two control systems; the opening and closing times of the injector sets (1) and (2) being programmed in the above computers by means of timing activators (9);

f) several, preferably one, UEGO probes (5) situated on the exhaust pipe, for monitoring the titer (or air/fuel ratio) of the combustion mixture.

FIG. 1 provides an illustration of the equipment of the present invention.

In FIG. 1, (1) represents the injector fed with reference fuel, (2) represents the injector fed with the fuel under examination, (3) is the switching relay of the fuel feeding system, (4) is the switching control and data acquisition system, (5) is the UEGO oxygen sensor situated on the exhaust pipe, (6) is the air flow-rate measurer situated upstream of the baffle of the intake manifold, (7) is a computer for programming the opening time of the injectors, (8) is an MCS memory emulator, (9) is a timing activator of the injector.

The following examples are provided for a better illustration of the present invention.

EXAMPLES

ENGINE

The engine selected for the test belongs to the motorcycle production of Yamaha set up by Bimota and is identified with the abbreviation FZ 750: it is a 4-cylinder 4T engine equipped with electronic injection, with water cooling of the cylinders. The main characteristics are shown in table 1.

TABLE 1

| | |
|---|---|
| Engine | 4 cycle |
| Power (Kw) | 71.7 to 10400 rpm |
| Maximum torque (Nm) | 69.48 to 9000 rpm |
| CYLINDERS | 4 in line |
| Nr. of valves per cylinder | 5 |
| Cooling | water |
| Bore and stroke (mm) | 68 × 51.6 |
| Displacement ($cm^3$) | 749 |
| Compression ratio | 11.2:1 |

INJECTION SYSTEM

For carrying out the test, the manifold is modified with the addition of a second set of in-flow injectors, directed towards the intake valves.

The engine is arranged so as to be able to function alternatively with the additional injectors fed with a fuel which does not give film deposit (2-methyl-2-butene) or with the original injectors (counterflow) which are fed with the test fuel (or fuel components).

Two independent fuel feeding circuits complete with temperature regulators, fuel pressure and control boards (ECU), were then set up.

The control boards are interfaced, by means of a memory emulator (MCS), to a computer from which the opening time of the injectors is programmed.

The activation of one injection system causes the simultaneous deactivation of the other. The switching control is run by a program (AVL) and activated by a deviator-relay.

UEGO PROBE

The probes (of NKG with an accuracy of ±0.02 λand with a response time of 0.1 seconds) are installed in the exhaust pipe at 30 cm from the confluence point of the discharges of the four cylinders.

FUEL FLOW METER

Two fuel flow meters are used (one for each circuit). These are gravimetric meters of AVL model 730 Dynamic.

AIR INTAKE FLOW METER

An air flow meter of the hot wire Mass Flow Meter Sensyflow type of Degussa, is used.

TEST PROCEDURE

The in-flow injectors are fed with 2-methyl-2-butene and the counterflow injectors dedicated to the formation of the deposit with the test fuel.

The starting of the cold engine is effected with the counterflow injectors fed with the test fuel.

Both the MCS systems are charged with running files and the opening time of the injector is selected.

When the conditioning phase has finished the fuel circuit of the counterflow injectors is washed with the test fuel.

The functionalization of the lambda probe signals is activated and the lambda value is controlled until the above value is equal to 1±0.02 both for the reference and test fuel.

After this phase, the test is carried out, which consists of two phases, i.e. a first deposit formation phase in which the in-flow injection passes to the counterflow injection, and a second deposit absorption phase in which the counterflow injection passes to the in-flow injection.

Each phase is repeated three times with relative data acquisition.

The average results of the tests are shown in the table, in which deposit quantity refers to the quantity of fuel (in milligrams) deposited on the walls of the manifold.

TABLE

| Fuel | Deposit quantity |
|---|---|
| 2-methyl-2-butene | 0 |
| isoprene | 20 |
| isopentane | 75 |
| iso-octane | 90 |
| toluene | 380 |
| xylene | 775 |

The Italian priority application No. MI97A 000172 is herein incorporated by reference.

We claim:

1. A process for the quantitative determination of gasoline film (or its components) deposited on the intake manifold of a controlled ignition engine using two sets of injectors (I) and (II), which comprises the following steps:

a) feeding, at a preset air/fuel ratio, a first set of injectors (I) with a first fuel selected from those which do not leave deposits in the feeding manifold; during the feeding of the first set of injectors (I), the second set of injectors (II) being inactive;

b) interruption of the first set of injectors (I) and simultaneous opening of the second set of injectors (II) fed with a second fuel to be tested, until an equilibrium stage of the air/fuel ratio is reached which is equal to that of step (a); during the above step (b) measurements being taken of the in-going air flow-rate ($A_i$) and the $A_i/F_i$ ratio of the exhaust gas, wherein $F_i$ is the flow-rate of fuel which actually enters the combustion chamber, i being the i-th time;

c) calculation of the mass of fuel film by integration of the difference of the flow-rate values measured in step (b); steps (a) and (b) possibly being carried out inversely.

2. The process according to claim 1, characterized in that the measurments during step (b) are carried out with a frequency of from 20 to 200 Hz.

3. The process according to claim 1, characterized in that the measurements during step (b) are carried out with a frequency of from 50 to 150 Hz.

4. The process according to claim 1, characterized in that it is carried out in the sequence step (a), step (b), step (c).

5. A system for the determination of the film of fuel deposited by a fuel, preferably gasoline, on the intake manifold of an engine with controlled ignition (SI engine) which, with reference to FIG. 1, comprises:

a) SI engine equipped with two sets of injectors, (1) and (2), the first (1) fed with a first fuel which does not leave deposits, the second set (2) fed with the fuel under examination;

b) devices (6) for measuring the air flow-rate;

c) devices (3) for switching the feeding fuel and consequently the injection set;

d) control systems (4) of the two injector sets, each equipped with its own feeding system, independent of each other;

e) memory emulators (8), computers (7) interfaced with each of the two control systems; the opening and closing times of the injector sets (1) and (2) being programmed in the above computers by means of timing activators (9);

f) several UEGO probes (5) situated on the exhaust pipe, for monitoring the titer (or air/fuel ratio) of the combustion mixture.

6. The system according to claim 5, characterized in that the first set of injectors is fed with 2-methyl-2-butene.

7. The system according to claim 5, characterized in that only one UEGO probe is situated on the exhaust pipe.

* * * * *